United States Patent [19]

Yeo et al.

[11] Patent Number: 5,069,865
[45] Date of Patent: Dec. 3, 1991

[54] METHOD OF FORMING A GRIPPER CAVITY IN A FUEL ROD END PLUG

[75] Inventors: Denis Yeo; David A. Boatwright, both of Columbia, S.C.

[73] Assignee: Westinghouse Electric Corp., Pittsburgh, Pa.

[21] Appl. No.: 627,275

[22] Filed: Dec. 14, 1990

[51] Int. Cl.$^5$ .............................................. G21C 3/10
[52] U.S. Cl. .................................. 376/451; 376/440; 376/452
[58] Field of Search ............... 376/451, 440, 452, 456; 294/906, 86.24, 86.28; 403/310, 311, 363; 125/23.02

[56] References Cited

U.S. PATENT DOCUMENTS

| | | | |
|---|---|---|---|
| 1,996,181 | 4/1935 | Wait | 29/148.2 |
| 2,408,596 | 10/1946 | Bednar et al. | 29/148.2 |
| 2,686,489 | 8/1954 | Kaestner | 112/52 |
| 4,716,018 | 12/1987 | Boatwright et al. | 376/451 |

Primary Examiner—Brooks H. Hunt
Assistant Examiner—Meena Chelliah

[57] ABSTRACT

A method of forming a gripper cavity in a nuclear fuel rod end plug includes the basic steps of providing an end plug blank having an internal bore of substantially uniform diameter that opens at an annular outer rim on the end plug blank, cold forming the end plug blank to produce an intermediate end plug in which the annular outer rim is transformed into a conical outer rim having a rounded internal surface that defines an inlet opening to the internal bore of a diameter less than that of the internal bore, and removing an external layer of material from the intermediate end plug and an internal layer of material from the rounded internal surface of the conical outer rim to produce a finished end plug having an internal gripper cavity composed of the internal bore and a cylindrical internal surface defining the inlet opening to the internal bore and being of smaller diameter than the internal bore.

16 Claims, 4 Drawing Sheets

METHOD OF FORMING A GRIPPER CAVITY IN A FUEL ROD END PLUG

BACKGROUND OF THE INVENTION

1. Field of the Invention

The present invention relates generally to fabrication of nuclear fuel rods and, more particularly, is concerned with a method of forming a gripper cavity in a fuel rod end plug.

2. Description of the Prior Art

In a typical nuclear reactor, such as a pressurized water type, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Each fuel rod includes nuclear fuel pellets and the opposite ends of the rod are closed by upper and lower end plugs to hermetically seal the rod. A cavity is formed in the lower end plug as part of the forming of the end plug. Subsequently, a groove is formed in the cavity by a secondary machining operation. The groove is provided in order to assist in assembling of the fuel assembly by insertion of the fuel rods into the grids of the fuel assembly. The groove in the cavity enables a gripping mechanism, such as disclosed in U.S. Pat. No. 4,966,745, assigned to the same assignee as the subject invention, to enter the lower end plug cavity, expand into the groove, and then pull the fuel rod at lower end plug through the grids of the fuel assembly already attached to the guide thimbles.

Several problems are associated with the current approach of machining the groove in the cavity. First, attaining the desired cavity and groove configuration requires an excessive amount of machining at a cost higher than the material cost of the bottom end plug itself. About one-half of the machining cost goes toward forming the groove in the cavity. Second, the fabrication of the groove is currently performed by an operator and thus depends on the operator doing it properly. However, occasionally the groove is left out completely due to operator oversight which creates fuel rod loading problems at final assembly. Third, sometimes the gripper mechanism shears out the material in the end plug due to high loading force and stress on the end plug.

Consequently, a need exists for a different approach to fabrication of the cavity and groove in the bottom end plug for the nuclear fuel rod so as to avoid the problems associated with the current techniques.

SUMMARY OF THE INVENTION

The present invention provides an end plug cavity forming method designed to satisfy the aforementioned needs. First, the end plug cavity forming method of the present invention employs roll-forming steps which significantly reduce the amount of machining required and thereby the associated cost. Second, the method of the invention is an automatic unattended operation which eliminates the possibility that the groove will be omitted due to operator oversight. Third, the method of the invention involves cold forming of the tip of the end plug which improves the strength of the gripper cavity and makes the end plug more resistant to damage during assembly loading operation.

Accordingly, the present invention is directed to a method of forming a gripper cavity in a nuclear fuel rod end plug. The cavity forming method comprises the steps of: (a) providing an end plug blank having an internal bore of substantially uniform diameter that opens at an annular outer rim on the end plug blank; (b) cold forming the end plug blank to produce an intermediate end plug in which the annular outer rim is transformed into a conical outer rim having a rounded internal surface that defines an inlet opening to the internal bore of a diameter less than that of the internal bore; and (c) removing an external layer of material from the intermediate end plug and an internal layer of material from the rounded internal surface of the conical outer rim to produce a finished end plug having an internal gripper cavity composed of the internal bore and a cylindrical internal surface defining the inlet opening to the internal bore and of smaller diameter than the internal bore. The cold forming includes rotating the end plug blank about a longitudinal axis, and concurrently advancing a plurality of rollers into contact with the annular outer rim on the end plug blank until the annular outer rim is transformed into the conical outer rim.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
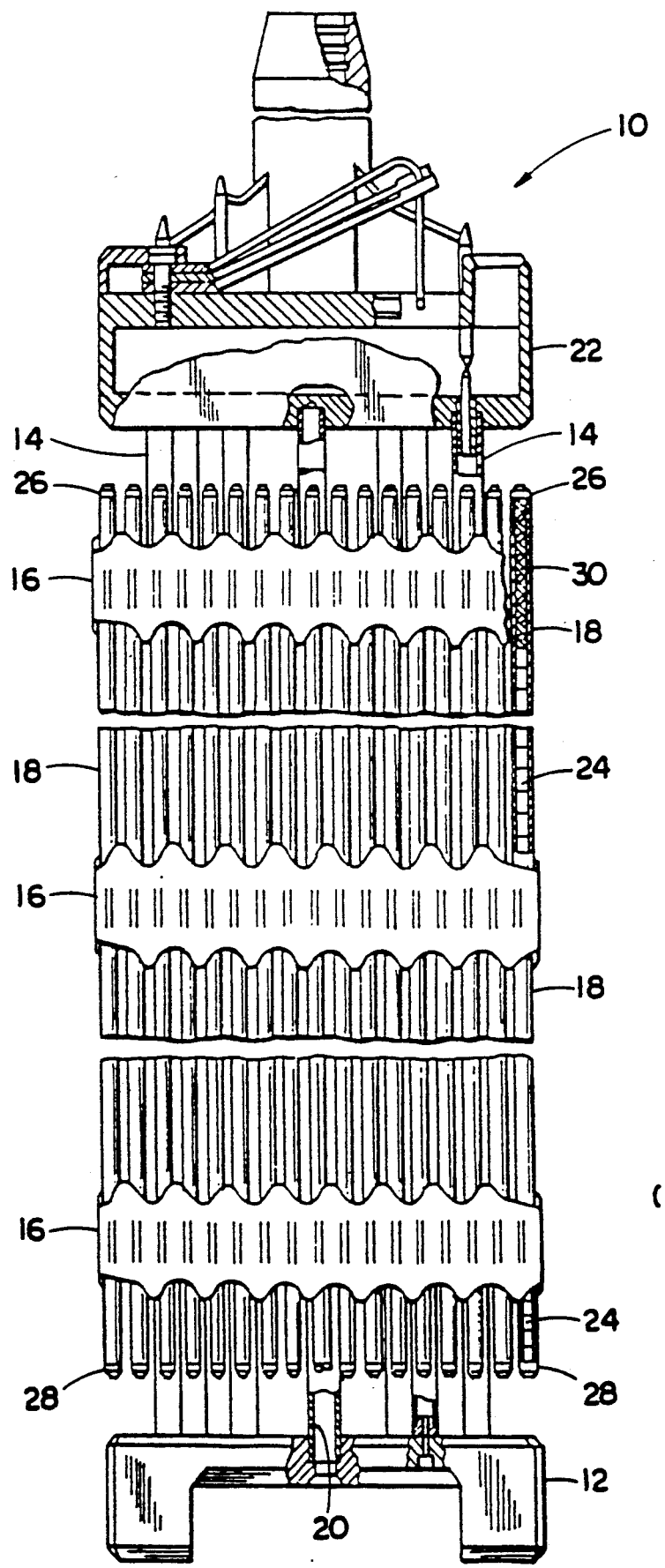
FIG. 1 is a side elevational view, with parts partially sectioned and broken away, of a prior art nuclear fuel assembly.

Referring now to the drawings, and particularly to FIG. 1, there is illustrated a prior art pressurized water nuclear reactor fuel assembly, represented in vertically foreshortened form and being generally designated by the numeral 10. The fuel assembly 10 basically includes a lower end structure or bottom nozzle 12 for supporting the assembly on a lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along and mounted to the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

In assembling the fuel assembly 10, it is conventional practice, first, to attach the transverse grids 16 to the longitudinally extending guide thimbles 14 at predetermined axially spaced locations therealong to provide a fuel assembly skeleton. Next, the fuel rods 18 are loaded by passing them through the cells of the grids 16. Typically, a fuel rod loader (not shown) is used which pulls the fuel rods 18 into the fuel assembly skeleton, passing them through the grid cells. The loader has a rod gripper which is, first, inserted through the grid cells, next, coupled to the lower end plug 28 of the fuel rod 18, and, lastly, withdrawn back through the grids 16, pulling the attached fuel rod 18 into the grids. After all fuel rods 18 have been loaded by repeating these operations of the gripper, the bottom and top nozzles 12, 22 are then attached to the lower and upper ends of the guide thimbles 14 to complete the fuel assembly.

Figure 2:
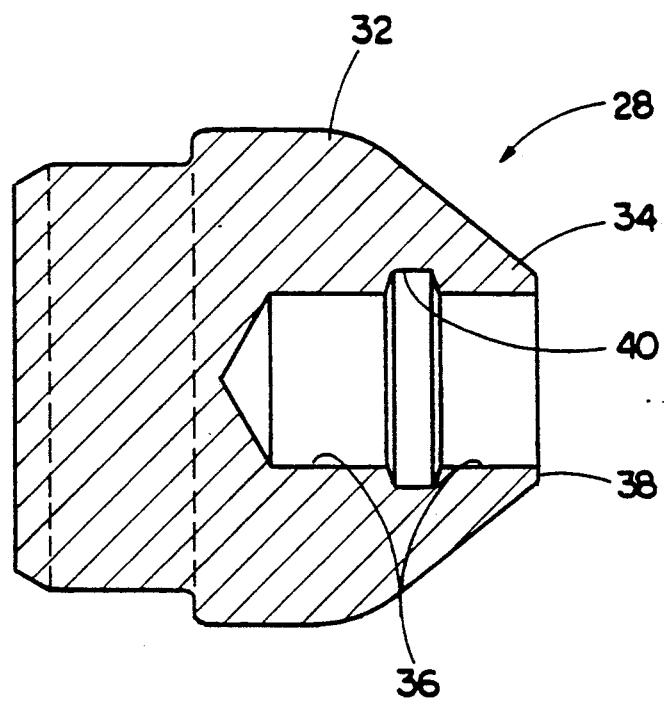
FIG. 2 is a prior art lower end plug fabricated by the machining method of the prior art and employed by the nuclear fuel rods of the prior art fuel assembly of FIG. 1.

Referring to FIG. 2, there is illustrated a prior art lower end plug 28 having a generally cylindrical body 32 with an outer tapered nose 34, a generally cylindrical internal cavity 36 formed in the body 32 and open at a flat end surface 38 on the tapered nose 34, and an annular groove 40, of larger diameter than the cavity 36, defined in the cavity 36 of the end plug 28. The fuel rod gripper, disclosed in the U.S. patent application referred earlier and the disclosure of which is incorporated herein by reference, mates with the end plug cavity 36 and groove 40 for connecting with the fuel rod 18 to pull it through the transverse grids 16.

The gripper includes a plurality of fingers having forward end portions with generally outwardly-projecting arcuate rim portions thereon. The fingers can assume a collapsed condition in which a rim formed by the rim portions is contracted to an outside diameter less than that of the lower end plug cavity 36 permitting the fingers at the rim to be inserted into or withdrawn from the end plug cavity 36. The fingers can also assume an expanded condition in which the rim formed by the rim portions on the fingers is expanded to an outside diameter greater than that of the lower end plug cavity 36 preventing the fingers at the rim to be inserted into or withdrawn from the end plug cavity 36. In the expanded condition, the rim portions extend outwardly into the internal circumferential or annular groove 40 formed in the cavity 36 of the lower end plug. So expanded, the rod gripper can be retracted, or withdrawn, by the fuel rod loader to pull the fuel rod 18 into the fuel assembly 10.

Heretofore, the internal cavity 36 and annular groove 40 have been formed by machining the end plug 28 at high cost in proportion to the cost of materials and other fabrication operations. Further, the machining of the groove 40 is carried out as a secondary operation performed subsequent to fabrication of the external configuration of the end plug 28 and the internal cavity 36. In addition to high cost, occasionally through oversight, the operator would fail to machine the internal groove 40 at all, causing subsequent disruption of the assembling of the fuel rod 18 through the grids 16 due to the absence of a way for the fuel rod gripper to grip the fuel rod 18.

End Plug Gripper Cavity Forming Method of the Invention

Figure 3:
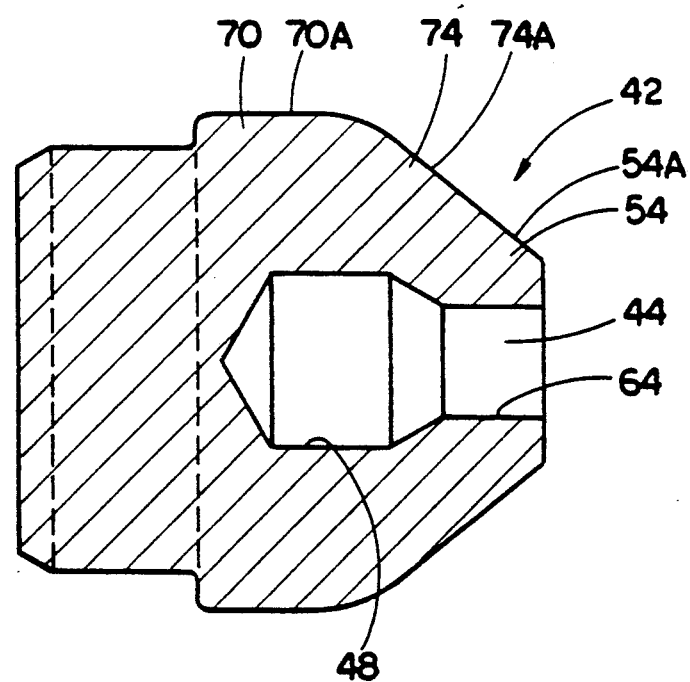
FIG. 3 is a lower end plug fabricated by a gripper cavity forming method of the present invention and which can be employed by the fuel rods of the fuel assembly of FIG. 1
Figure 8:
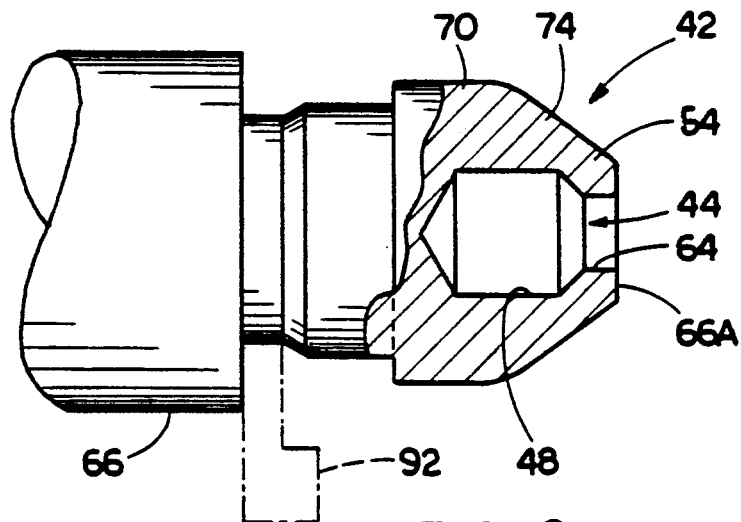

Referring to FIGS. 3 and 8, there is illustrated a lower end plug 42 having an internal gripper cavity 44 fabricated by the cavity forming method of the present invention. The gripper cavity forming method of the present invention substantially overcomes the problems associated with the prior art approach of separately machining the gripper cavity 36 and groove 40. Basically, the gripper cavity forming method of the present invention includes the basic steps of, initially, providing an end plug blank 46, as shown in FIG. 4, having an internal bore 48 of substantially uniform diameter that opens at an annular outer rim 50 on the end plug blank 46, next, cold forming the end plug blank 46, as shown in FIG. 5, to produce an intermediate end plug 52, as shown in FIG. 6, in which the annular outer rim 50 is transformed into a conical outer rim 54 having a rounded internal surface 56 that defines an inlet opening 58 to the internal bore 48 of a diameter less than that of the internal bore 48, and, then finally, removing an external layer 60 of material from the intermediate end plug 52 and an internal layer 62 of material from the rounded internal surface 56 of the conical outer rim 50 to produce a finished end plug 42 having the internal gripper cavity 44, as seen in FIGS. 3 and 8, composed of the internal bore 48 and a cylindrical internal surface 64 which defines the inlet opening 58 to the internal bore 48 and is of smaller diameter than the internal bore.

Figure 4:
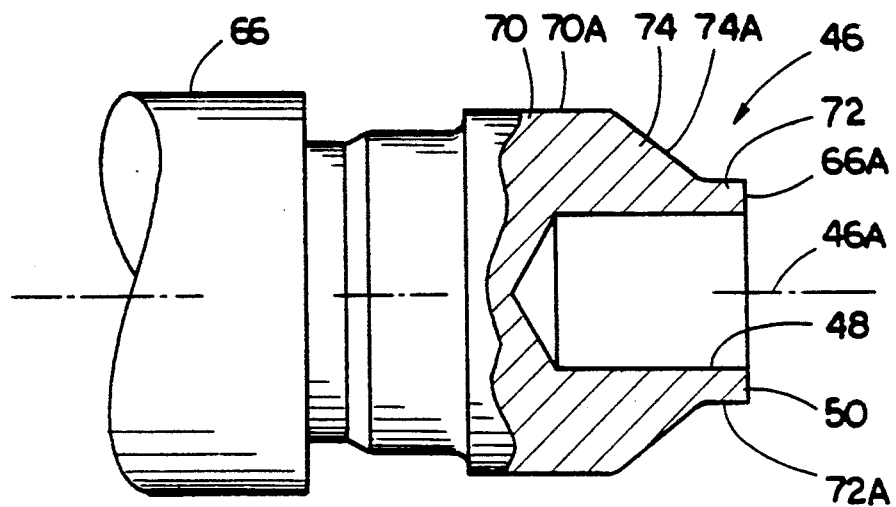
FIG. 4 is a side elevational view, partly in longitudinal section, of a end plug blank formed after performance of initial steps of the method of the present invention.
Figure 5:
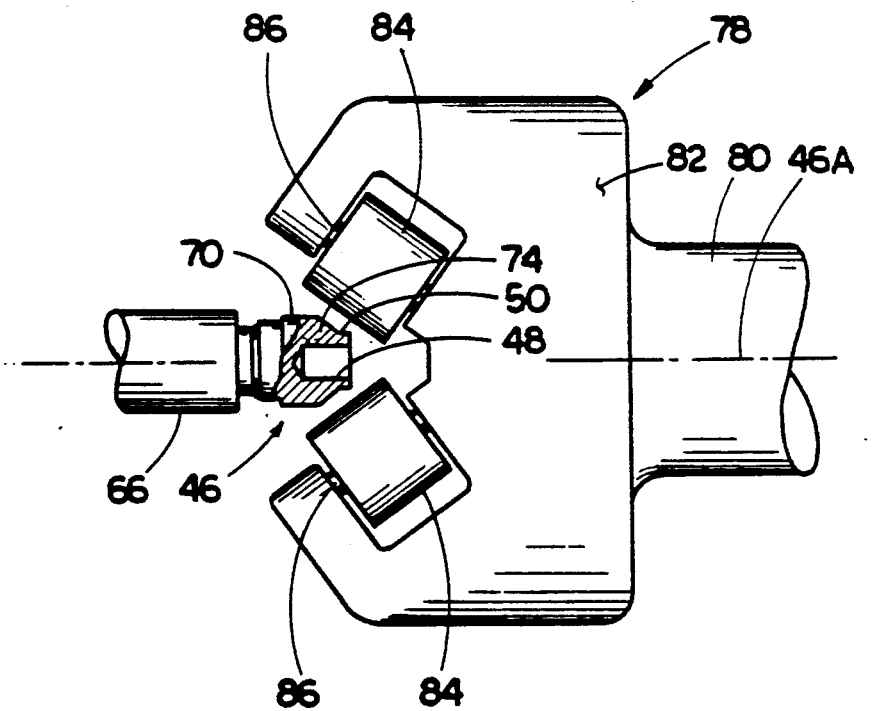
FIG. 5 is a side elevational view of a rolling tool used in roll forming step of the forming method of the present invention.
Figure 6:
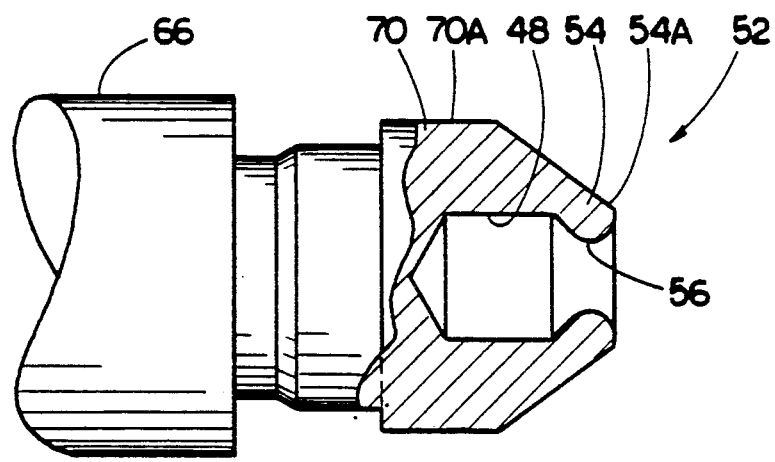
FIGS. 6-8 are side elevational view, partly in longitudinal section, of the end plug at successive stages of completion after performance of intermediate and final steps of method of the present invention.

Referring to FIGS. 4-8, there is illustrated the successive stages of completion of the end plug 42 of FIG. 3 by performance of the steps of forming the gripper cavity 44 in the end plug 42. The initial steps of the gripper cavity forming method of the present invention result in the formation of an end plug blank 46 with the internal bore 48, as seen in FIG. 4. More particularly, the end plug blank 46 is formed by mounting a solid bar 66 of material on a conventional rotatable spindle (not shown) and machining the end of the bar 66 using a conventional cutting tool (not shown) to provide the profile of the exterior of the end plug blank 46 shown in FIG. 4. Then, the internal bore 48 having the constant uniform diameter is drilled into the end surface 66A of the solid bar 66 by using a conventional rotary drill bit (not shown). By way of example, the diameter of the internal bore 48 can be 0.165 inch.

The end plug blank 46 so produced has a longitudinal axis 46A and is composed of an inner portion 70 connected to the remainder of the solid bar 66, an outer portion 72, and a middle portion 74 interconnecting the inner and outer portions 70, 72. The inner portion 70 has a cylindrical external surface 70A of a first diameter. The outer portion 72 has a cylindrical external surface 72A of a second diameter being less than the first diameter of the inner portion 70. As an example, the second diameter can be 0.245 inch and the first diameter 0.370 inch. The middle portion 74 has a conical external surface 74A which extends between and interconnects the external surfaces 70A, 72A of the inner and outer portions 70, 72. As an example, the included angle between the conical external surface 74A and the longitudinal axis 46A can be 37°. Also, the inner, middle and outer portions 70, 74, 72 extend along and symmetrically about the longitudinal axis 46A of the end plug blank 46.

The internal bore 48 formed by drilling the end plug blank 46 is open at the end surface 66A and extends through the outer and middle portions 72, 74 thereof and into the inner portion 70 thereof so as to define a continuous internal cylindrical bore surface 76. The internal cylindrical bore surface 76 has the aforementioned constant uniform diameter and extends along and concentrically about the longitudinal axis 46A of the end plug blank 46. The internal bore surface 76 is also concentric with the cylindrical external surfaces 70A, 72A of the inner and outer portions 70, 72 of the end plug blank 46 and form with the outer portion the annular cylindrical outer rim 50 on the end plug blank 46.

Referring to FIGS. 5 and 6, there is illustrated the intermediate cold forming step of the cavity forming method and the intermediate stage of completion of the end plug 42. A rolling tool 78 is provided for performing cold forming, or rotary forging, of the end plug blank 46 to produce the intermediate end plug 52 shown in FIG. 6. The cold forming step transforms the annular cylindrical outer rim 50 of the end plug blank 46 having the cylindrical external and internal surfaces 72A, 76 into the conical outer rim 54 having the rounded internal surface 56 and a conical external surface 54A. The rounded internal surface 56 now defines the inlet opening 58 to the internal bore 48 which has a smaller diameter than the internal bore. As an example, the inlet opening 58 can typically range from 0.110-0.120 inch compared to 0.165 inch for the diameter of the internal bore 48. The conical external surface 54A of the conical outer rim 54 provides an extension of the conical external surface 74A of the middle portion 74 of the end plug blank 46.

The rolling tool 78 includes a tool mounting shank 80 having a head end 82 and a plurality of hardened metal, such as steel, rollers 84 rotatably mounted by axles 86 on the head end 82. Although only two rollers 84 are shown, typically three rollers would be provided, oriented at an included three-dimensional angle equal to the angle made by the conical external surface 74A with the longitudinal axis 46A of the end plug blank 46, which in the example given above is 37°. Thus, the cold forming step is performed by concurrently rotating the end plug blank 46 about its longitudinal axis 46A through rotation of the machine spindle and advancing the rollers 84 along the longitudinal axis 46A into contact with the annular outer rim 50 on the end plug blank 46 until the annular outer rim 50 is transformed, or reformed, into the configuration of the conical outer rim 54, which occurs when the rollers become seated against the conical external surface 74A. The rotation of the end plug blank 46 engaged with the rollers 84 drives the rotation of the rollers.

Figure 7:
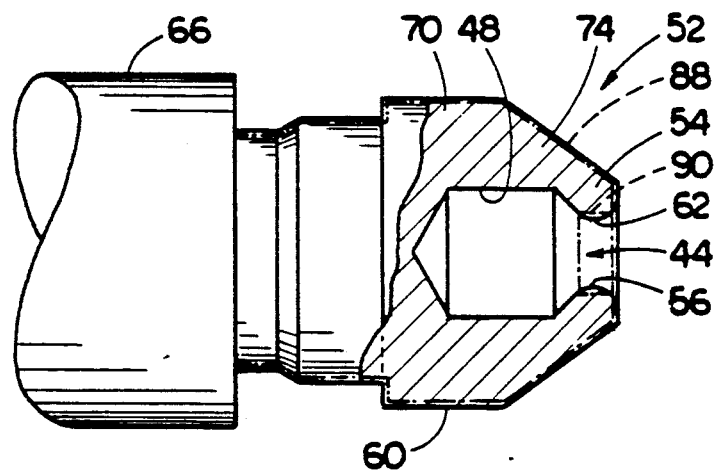

Referring to FIGS. 7 and 8, there is illustrated the final machining step of the cavity forming method and the final stage of completion of the end plug 42. The machining is performed by a conventional cutting tool (not shown). The intermediate end plug 52 is transformed to produce the finished end plug 42 by removing the external layer 60 of material (that being between the dashed surface 88 and the external surfaces 70A, 74A, 54A) from the intermediate end plug 52 and the internal layer 62 of material (that being between the dashed surface 90 and the rounded internal surface 56) from the rounded internal surface 56 of the conical outer rim 54. The finish machining removes impurities embedded in the external surfaces of the intermediate end plug 52 as a result of the rolling contact with the rollers 84.

The finished end plug 42 now includes the internal gripper cavity 44 composed of the internal bore 48 and the continuous cylindrical internal surface 64 which define the inlet opening 58 to the internal bore 48. The surface 64 of the inlet opening 58 is of a smaller diameter than the internal bore 48 which enables the gripping mechanism to grip the end plug 42 and pull the fuel rod 18 through the grids 16. The finished end plug 42 is severed from the bar 66 by a conventional cutting tool 92, as seen in phantom outline in FIG. 8.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A method of forming a gripper cavity in a nuclear fuel rod end plug, comprising the steps of:
   (a) providing an end plug blank having an internal bore of substantially uniform diameter that opens at an annular outer rim on said end plug blank;

(b) cold forming said end plug blank to produce an intermediate end plug in which said annular outer rim is transformed into a conical outer rim having an internal surface rounded with respect to a circumferential center point about the base axis that defines an inlet opening to said internal bore of a diameter less than that of said internal bore; and (c) removing an external layer of material from said intermediate end plug and an internal layer of material from said rounded internal surface of said conical outer rim to produce a finished end plug having an internal gripper cavity composed of said internal bore and a cylindrical internal surface defining said inlet opening to said internal bore and being of smaller diameter than said internal bore.

2. The method as recited in claim 1 wherein said end plug blank has a longitudinal axis and is composed of an inner portion having an external surface, an outer portion having an external surface of a diameter less than that of said external surface of said inner portion, and a middle portion having a conical external surface extending between and interconnecting said external surfaces of said inner and outer portions.

3. The method as recited in claim 2 wherein said internal bore opens at said outer portion and extends through said outer and middle portions and at least partially into said inner portion so as to define said annular outer rim at said outer portion.

4. The method as recited in claim 2 wherein said intermediate end plug produced by said cold forming has a conical external surface that is an extension of said conical external surface of said middle portion of said end plug blank.

5. The method as recited in claim 1 wherein said providing includes machining a solid bar of material to produce said end plug blank.

6. The method as recited in claim 5 wherein said providing includes drilling said solid bar of material to produce said internal bore of uniform diameter in said end plug blank.

7. The method as recited in claim 1 wherein said cold forming includes rotating said end plug blank about a longitudinal axis.

8. The method as recited in claim 7 wherein said cold forming further includes advancing a plurality of rollers into contact with said annular outer rim on said end plug blank until said annular outer rim is transformed into said conical outer rim.

9. A method of forming a gripper cavity in a nuclear fuel rod end plug, comprising the steps of:
(a) providing an end plug blank having a longitudinal axis and being composed of an inner portion having a cylindrical external surface of a first diameter, an outer portion having a cylindrical external surface of a second diameter being less than said first diameter of said inner portion, and a middle portion having a conical external surface extending between and interconnecting said cylindrical external surfaces of said inner and outer portions, said inner, middle and outer portions extending along and symmetrically about said longitudinal axis;
(b) drilling an internal bore of uniform diameter in said end plug blank through said outer and middle portions thereof and into said inner portion thereof so as to define a continuous internal cylindrical surface having a constant diameter and extending concentrically about said longitudinal axis of said end plug blank and concentric with said cylindrical external surfaces of said inner and outer portions of said end plug blank such that said outer portion of said end plug blank defines an annular cylindrical outer rim;
(c) cold forming said end plug blank to produce an intermediate end plug in which said annular cylindrical outer rim of said end plug blank is transformed into a conical outer rim having an internal surface rounded with respect to a circumferential center point about the base axis and conical external surface, said rounded internal surface defining an inlet opening to said internal bore of smaller diameter than said internal bore, said conical external surface providing an extension of said conical external surface of said middle portion of said end plug blank; and
(d) machining said intermediate end plug to remove an external layer of material from said intermediate end plug and an internal layer of material from said rounded internal surface of said conical outer rim to produce a finished end plug having an internal gripper cavity composed of said internal bore and a cylindrical internal surface defining said inlet opening to said internal bore being of smaller diameter than said internal bore.

10. The method as recited in claim 9 wherein said providing includes machining a solid bar of material to produce said end plug blank.

11. The method as recited in claim 10 wherein said drilling includes drilling said solid bar of material to produce said internal bore of uniform diameter in said end plug blank.

12. The method as recited in claim 9 wherein said cold forming includes rotating said end plug blank about said longitudinal axis.

13. The method as recited in claim 12 wherein said cold forming further includes advancing a plurality of rollers into contact with said annular outer rim on said end plug blank until said annular outer rim is transformed into said conical outer rim.

14. A method of forming a gripper cavity in a nuclear fuel rod end plug, comprising the steps of:
(a) machining a solid bar of material to produce an end plug blank having a longitudinal axis and being composed of an inner portion having a cylindrical external surface of a first diameter, an outer portion having a cylindrical external surface of a second diameter being less than said first diameter of said inner portion, and a middle portion having a conical external surface extending between and interconnecting said cylindrical external surfaces of said inner and outer portions, said inner, middle and outer portions extending along and symmetrically about said longitudinal axis of said end plug blank;
(b) drilling an internal bore of uniform diameter in said end plug blank through said outer and middle portions thereof and into said inner portion thereof so as to define a continuous internal cylindrical surface having a constant diameter extending concentrically about said longitudinal axis of said end plug blank and concentric with said cylindrical external surfaces of said inner and outer portions of said end plug blank such that said outer portion of said end plug blank is formed into an annular cylindrical outer rim;
(c) cold forming said end plug blank to produce an intermediate end plug in which said annular cylindrical outer rim of said end plug blank is transformed into a conical outer rim having an internal surface rounded with respect to a circumferential center point about the base axis and conical external surface, said rounded internal surface defining an inlet opening to said internal bore being of smaller diameter than said internal bore, said conical external surface providing an extension of said conical external surface of said middle portion of said end plug blank; and (d) machining said intermediate end plug to remove a external layer of material from said intermediate end plug and an internal layer of material from said rounded internal surface of said conical outer rim to produce a finished end plug having an internal gripper cavity composed of said internal bore and a cylindrical internal surface defining said inlet opening to said internal bore and being of smaller diameter than said internal bore.

15. The method as recited in claim 14 wherein said cold forming includes rotating said end plug blank about said longitudinal axis.

16. The method as recited in claim 15 wherein said cold forming further includes advancing a plurality of rollers into contact with said annular outer rim on said end plug blank until said annular outer rim is transformed into said conical outer rim.

* * * * *